United States Patent [19]

Kerner et al.

[11] Patent Number: 4,514,231

[45] Date of Patent: Apr. 30, 1985

[54] NATURAL OXIDIC OR SILICATE FILLER MODIFIED ON THE SURFACE, A PROCESS FOR ITS PRODUCTION

[75] Inventors: Dieter Kerner; Peter Kleinschmit, both of Hanau; Alan Parkhouse, Wesseling; Siegfried Wolff, Bornheim-Merten, all of Fed. Rep. of Germany

[73] Assignee: Degussa Aktiengesellschaft, Frankfurt am Main, Fed. Rep. of Germany

[21] Appl. No.: 602,768

[22] Filed: Apr. 23, 1984

[30] Foreign Application Priority Data

Apr. 23, 1983 [DE] Fed. Rep. of Germany ....... 3314742

[51] Int. Cl.³ .................... C09C 3/12; C08K 9/06; C08L 21/00
[52] U.S. Cl. ............................. 106/309; 106/288 Q; 106/290; 106/300; 106/308 Q; 106/308 N; 523/212; 523/213
[58] Field of Search ............... 523/212, 213; 106/290, 106/288 Q, 308 N, 309, 308 Q, 300

[56] References Cited

U.S. PATENT DOCUMENTS

| | | | |
|---|---|---|---|
| 3,227,675 | 1/1966 | Papelos | 260/41 |
| 3,567,680 | 3/1971 | Iannicelli . | |
| 3,873,489 | 3/1975 | Thurn et al. | 524/493 |
| 3,994,742 | 11/1976 | Russell et al. | 523/213 |
| 4,076,550 | 2/1978 | Thurn et al. | 106/288 Q |
| 4,128,438 | 12/1978 | Wolff et al. | 523/213 |
| 4,222,915 | 9/1980 | Wolff et al. | 524/432 |
| 4,229,333 | 10/1980 | Wolff et al. | 524/575 |
| 4,278,585 | 7/1981 | Stacy et al. | 524/262 |
| 4,278,587 | 7/1981 | Wolff et al. | 524/262 |
| 4,359,342 | 11/1982 | Stacy et al. | 106/308 N |
| 4,373,041 | 2/1983 | Woods et al. | 524/270 |
| 4,376,184 | 3/1983 | Itoh et al. | 524/492 |
| 4,400,485 | 8/1983 | Mukamal et al. | 523/213 |
| 4,431,704 | 2/1984 | Springer | 524/566 |
| 4,436,847 | 3/1984 | Wagner | 523/212 |

Primary Examiner—Herbert J. Lilling
Attorney, Agent, or Firm—Cushman, Darby & Cushman

[57] ABSTRACT

The invention is directed to the modification of natural oxidic or silicate fillers with water insoluble sulfur containing organosilicon compounds. For this purpose, the fillers are converted into an aqueous suspension and treated with the organosilicon compounds, in a given case in the presence of an emulsifier.

10 Claims, No Drawings

NATURAL OXIDIC OR SILICATE FILLER MODIFIED ON THE SURFACE, A PROCESS FOR ITS PRODUCTION

BACKGROUND OF THE INVENTION

The invention is directed to natural oxide or silicate fillers modified with organosilicon compounds, a process for their production and their use in vulcanizable rubber mixtures.

It is known to treat oxide surfaces with organosilicon compounds in order to improve the bond between oxidic filler and organic polymers of the most different chemical composition through this pretreatment and accordingly to improve the reinforcing properties of the filler.

For example, for this purpose the organosilicon compound can be dissolved in an organic solvent and this solution treated subsequently, e.g., with clay, Papelos, U.S. Pat. No. 3,227,675, the entire disclosure of which is hereby incorporated by reference and relied upon.

It is known from Iannicelli, U.S. Pat. No. 3,567,680, the entire disclosure of which is hereby incorporated by reference and relied upon, to modify kaotin suspended in water with mercapto and aminosilanes. The organosilicon compounds concerned, however, are watersoluble in the amounts needed for the modification so that even in this case the treatment of the filler is carried out from a solution.

The problem of the invention was to find oxidic or finely divided oxidic or silicate fillers modified with water insoluble organosilicon compounds, which are compatible with rubbers and a process for their production which despite the water insolubility can be worked in aqueous phase without a solvent.

SUMMARY OF THE INVENTION

The invention is directed to natural oxidic or silicate fillers which are compatible with rubbers and which are modified on the surface with at least one organosilicon compound which is water insoluble and has the formula (I):

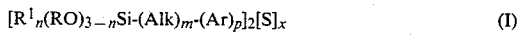

where
R is an alkyl group having 1 to 4 carbon atoms, i.e., methyl to butyl including all of the isomers, or is a $C_1$-$C_4$-alkyl-$C_1$-$C_4$ alkoxy group or a phenyl group and $R^1$ is an alkyl group having 1 to 4 carbon atoms or the phenyl group, all of the R and $R^1$ groups can be the same or different,
n is 0, 1, or 2,
Alk is a divalent, straight or branched hydrocarbon group having 1 to 6 carbon atoms,
m is 0 or 1,
Ar is an arylene group having 6 to 12 carbon atoms in the rings,
p is 0 or 1 with the proviso that p and m cannot simultaneously be zero, and x is a number from 2 to 8.

The invention is further directed to a process for the production of modified natural oxide or silicate fillers which comprises (a) emulsifying in water a water insoluble organosilicon compound of the formula:

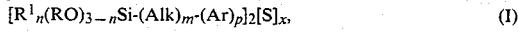

in a given case in the presence of a surface active material, (b) with stirring mixing this emulsion with aqueous suspension of a finely divided oxide or silicate filler or a mixture of such fillers at a temperature of 10° to 50° C., preferably room temperature, (c) heating the mixture in a given case to a temperature of 50° to 100° C., preferably from 60° to 80° C., and (d) after 10 to 120 minutes, preferably 30 to 60 minutes, filtering off the modified filler and drying the suspension at a temperature of 100° to 150° C., preferably 105° to 120° C., or spray drying the suspension.

The organosilicon compound of formula (I) can be emulsified in water either individually or as a mixture of different compounds. If the total amount of these compounds after mixing with the suspension amounts to less than 3 weight % (based on the aqueous suspension), there is added a surface active substance to aid the formation of the emulsion.

This is no longer necessary at concentrations of organosilicon compound (or compounds) of 3 weight % or above, although it can be helpful.

The emulsion is preferably produced at room temperature. However, there are also suited temperatures which extend up to the boiling point of the aqueous emulsion.

The concentration of the organosilicon compound (or compounds) in the emulsion produced preferably amounts to 10 to 80 weight %, preferably 20 to 50 weight %, based on the total amount of emulsion.

The pH of the emulsion as well as the pH of the filler suspension after mixing with the emulsion is in the weakly acid or weakly alkaline range, preferably at a pH of about 7.

By water insoluble is meant:
After the mixing of the emulsion (without surface active material) with the suspension of the filler in the desired pH and concentration ranges, there is formed around the filler particles no clear solution of organosilicon compound or compounds. Rather, there remains the separate water phase and organsolicon compound phase. The oligosulfidic organosilanes of the above-stated formula (I) are known and can be produced by known processes. For example, as preferably employed organosilanes, there are included those that are producible, e.g., according to Belgium Pat. No. 787,691, e.g., bis-(trialkoxysilyl-alkyl)-oligosulfides such as bis-(trimethoxy-, -triethoxy-, -trimethoxyethoxy-, -tripropoxy-, -tributoxy-, -tri-i-propoxy- and -tri-i-butoxy-silylmethyl)-oligosulfides, namely particularly the di-, tri-, tetra-, penta-, hexasulfide etc., furthermore, bis-(2-tri-methoxy-, -triethoxy-, -trimethoxyethoxy-, -tripropoxy- and -tri-n- and -i-butoxy-ethyl)-oligosulfide especially the di-, tri-, tetra-, penta-, hexasulfide etc., additionally the bis-(3-trimethoxy-, -triethoxy-, -trimethoxyethoxy-, -tripropoxy-, -tri-n-butoxy- and tri-i-butoxy-silylpropyl)oligosulfides namely again the di-, tri-, tetrasulfide up to the octasulfides, furthermore the corresponding bis-(3-trialkoxysilylisobutyl)-oligosulfides, the corresponding bis-(4-trialkoxysilylbutyl)-oligosulfides. Again, there are preferred among those chosen, relatively simply constructed organosilanes of formula (I) including the bis-(3-trimethoxy-, -triethoxy- and tripropoxysilylpropyl)-oligosulfides, namely di-, tri-, tetra- and pentasulfides, especially the triethoxy compounds having 2, 3, or 4 sulfur atoms and their mixtures. In formula (I), Alk is a divalent, straight or branched hydrocarbon group, preferably a saturated alkylene group with a straight carbon chain having 1 to 4 carbon atoms.

There are also especially suited the silanes having the following structural formulae:

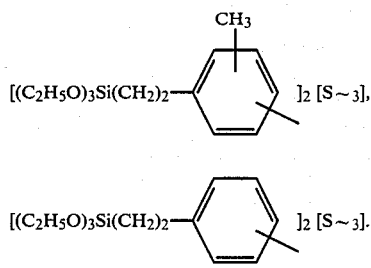

Methoxide analogues are producible according to German As No. 2558191.

As surface active materials, there are preferably used non-ionic, cationic, and anionic surfactants. Their concentration in the emulsion is 1 to 7 weight %, preferably 3 to 5 weight %.

Examples of these types of surfactants are alkylphenolpolyglycol ethers, e.g., nonylphenolpolyethylene glycol ether having 8, 12, or 20 ethylene oxide units or octylphenolpolyethylene glycol having 10, 12, or 20 units, alkylpolyglycol ethers, e.g., polyethyleneglycol lauryl ether having 10 to 20 ethylene oxide units, polyglycols, e.g., polyethylene glycol molecular weight 2000, alkyltrimethylammonium salts, e.g., octadecyl trimethyl ammonium chloride, lauryl trimethyl ammonium chloride, or cetyl trimethylammonium bromide, dialkyldimethyl ammonium salts, e.g., cetyl ethyl dimethyl ammonium bromide, alkylbenzyltrimethyl ammonium salts, e.g., lauryl benzyl dimethyl ammonium chloride, alkylbenzenesulfonates, e.g., sodium dodecylbenzenesulfonate or sodium decylbenzenesulfonate, alkylhydrogensulfates, alkylsulfates, e.g., sodium lauryl sulfate or sodium oleyl sulfate.

The natural fillers to be modified as well as mixtures of two or more of these fillers are known per se as fillers in the rubber technology. An essential prerequisite for their use is the presence of OH groups on the surface of the filler particles which can react with the alkoxy groups of the organosilicon compounds. It is a matter of oxidic and silicate fillers which are compatible with rubbers and which have the necessary fine particle size for this purpose.

There are particularly suited as natural silicates kaolins or clays. However, there can also be employed kieselguhr or diatomaceous earths.

There may be mentioned, for example, as oxidic fillers aluminum oxide (alumina), aluminum hydroxide or trihydrate and titanium dioxide, which are obtained from naturally occuring sources.

The emulsion is mixed in such amount with the filler suspension that the concentration of organosilicon compound is 0.3 to 15 weight %, preferably 0.3 to 2 weight %, based on the amount of filler.

The modified filler contains 0.3 to 15 weight %, preferably 0.3 to 2 weight % of the organosilicon compounds based on the dry filler.

They are particularly suitable for use in vulcanizable and moldable mixtures which are produced according to customary processes in the rubber industry.

There has not been found a disadvantage effect of the surface active materials which in certain cases are adsorbed on the surfaces of the filler.

There are included in the suitable types of rubber all those rubbers (and mixtures of such rubbers) containing double bonds and which are cross-linkable with sulfur as well as with vulcanization accelerators to elastomers. Especially these include the halogen-free types of rubber, preferably so-called diene elastomers. There may be mentioned, for example, as within these types of rubber natural and synthetic rubbers which optionally are oil extended, such as natural rubber, butadiene rubber (polybutadiene), isoprene rubber (polyisoprene), butadiene-styrene rubber, butadiene-acrylonitrile rubber, butyl rubber, terpolymers of ethylene, propylene and for example non-conjugated dienes, e.g., cyclooctadiene or norbornadiene. Further, the following additional rubbers are considered for rubber mixtures with the rubbers mentioned.

Carboxyl rubbers, epoxide rubbers, transpolypentamer, halogenated butyl rubber, rubbers based on 2-chlorobutadiene, ethylene-vinyl acetate copolymers, ethylene-propylene copolymers, in a given case also chemical derivatives of natural rubber as well as modified natural rubber. Preferably, there are employed natural rubber and polyisoprene rubber (i.e., synthetic polyisoprene), namely alone or in mixtures with each other and/or at times in mixtures with the above-mentioned rubbers.

The modified filler is mixed in such amount that the parts by weight of the organosilicon compounds contained on it is 0.3 to 10 weight %, preferably between 0.3 and 2 weight % based on the rubber portion.

Thereby, there is naturally considered the prescribed total portion of filler in the vulcanizable rubber mixture.

This means that either the total amount of filler added or only a partial amount can be modified. In the latter case then, the missing portion is mixed in in unmodified form.

The modified fillers produced according to the invention in the vulcanized rubber mixtures lead to a clear improvement of the technical properties of the rubber in comparison to mixtures in which the organosilicon compound and the filler are worked in separately.

There is also shown the superiority of rubber vulcanizates which contain fillers produced according to the invention compared to vulcanizates with a filler which was modified with a water soluble organosilicon compound.

Unless otherwise indicated, all parts and percentages are by weight.

The compositions can comprise, consist essentially of, or consist of the stated materials and the process can comprise, consist essentially of, or consist of the stated steps with the recited materials.

DETAILED DESCRIPTION

The modified filler was tested in the following rubber mixtures.

| Test Recipe 1 - Natural Rubber | |
|---|---|
| SMR 5, ML 4 = 68 | 100 |
| Filler | 100 |
| ZnO, RS | 5 |
| Stearic Acid | 2 |
| Agerite Stalite (alkylated diphenylamine) | 1 |
| Circo Light R.P.A. | 4 |

-continued

| Test Recipe 1 - Natural Rubber | |
|---|---|
| (hydrocarbon oil) | |
| MBTS | 1.25 |
| Sulfur | 2.75 |

| Test Recipe 2- SBR 1500 | |
|---|---|
| Ameripol 1502 | 100 |
| Filler | 150 |
| ZnO, RS | 3 |
| Stearic acid | 1 |
| D.E.G. (diethyl guanidine) | 3 |
| TMTD (tetramethylthuiramdisulfide) | 0.1 |
| MBTS (2,2'-dithiobisbenzothiazole) | 1.5 |
| Sulfur | 2 |

The following products were used as emulsifiers, organosilicon compounds, and fillers.

| Emulsifiers | |
|---|---|
| Marlophen 812 = (CWH) | Nonylphenolpolyglycolether (12 ethyleneoxide units) |
| Marlophen 820 = (CWH) | Nonylphenolpolyglycolether (20 ethyleneoxide units) |
| Marlowet GFW = (CWH) | Alkylphenolpolyglycolether |
| Barquat MB 80 = | Alkyldimethylbenzylammoniumchloride (Lonza) |
| Organosilicon compound | |
| Si 69 = (Degussa) | Bis-3-(triethoxysilyl)propyl-tetrasulfane |
| A 189 = (Union Carbide) | Mercaptopropyltrimethoxysilane |
| Clays | |
| Suprex Clay, (Huber) | Hexafil (ECC), HEWP (ECC), Speswhite (ECC) |

To evaluate the rubber technical properties of the vulcanizate, the following values were determined:

| Tension value = Modulus | according to | DIN 53504 |
|---|---|---|
| Firestone Ball Rebound | according to | AD 20245 |
| Abrasion resistance | according to | DIN 53516 |
| Compression Set B | according to | ASTM D 395 |
| GOODRICH Flexometer | according to | ASTM D 623A |

EXAMPLE 1

Si 69 was added with vigorous stirring to an aqueous tensile (surfactant) solution having a concentration of 40 g/l so that the concentration of Si 69 in the emulsion formed was 90 g/l. Immediately after the preparation, 200 ml of this emulsion were added at 40° C. with stirring to a suspension of 6 kg of Suprex clay in 25 kg of water. The suspension was heated to 85° C., subsequently filtered and dried. In a test, the heating was eliminated. The dried material was first ground on a tooth disc mill and subsequently on a pinned disc mill.

A summary of the emulsifiers used and the results produced with these in natural rubber and synthetic rubber expressed by the Modulus 300 is given in Table 1. It can be established that a distinct increase in performance is produced with all the emulsifiers used compared to the reference mixture having an untreated Suprex Clay.

There is shown in Example 2 that besides the improved handleability of the modified fillers compared to adding silane during the mixing into the rubber matrix there can be produced an increase in performance.

EXAMPLE 2

The procedure was analogous to that is Example 1. There was employed as the emulsifier Marlophen 812. There was applied either 0.3 or 0.45 parts by weight of silane to 100 parts by weight of Suprex Clay. For comparison besides the water insoluble Si69, there was used in these same amounts water soluble Al89. The products obtained thereby were again worked into natural and synthetic rubber. For comparison, Si69 in the corresponding concentrations was directly worked into the rubber mixtures. Table 2 shows the results obtained. It can be seen that with the water insoluble Si69, there was a modification of the filler which exceeded the separate addition into the rubber mixture.

In Example 3, there is shown the mode of operation with additional fillers.

Three different fillers in aqueous suspension were modified with 0.5 parts by weight of Si69 based on 100 parts by weight of filler. There was added at room temperature with stirring an emulsion of 80 grams of Si69 in 200 ml of a solution of Marlowet GFW having a concentration of 40 g/l to a suspension of 16 kg of Hexafil in 20 kg of water. After half an hour, the suspension was poured on a metal sheet and dried in a drier. The working up was carried out as in Example 1. The same process was carried out with HEWP, in which case a part of the amount added was changed as follows: 15 kg of HEWP, 86 kg of water, 75 grams of Si69.

As a third experiment, there was brought to reaction 30 kg of a prepared specific Speswhite slurry (=1.67 g/cm$^3$, solids content 1.1 g/ml) with 100 grams of Si69 in 200 ml of Marlowet GFW-solution (concentration 40 g/l). The test results in natural and synthetic rubber are shown in Table 3. Here also there is noted a clear increase in the moduli.

Besides the improvement of the moduli, there are also improved other important rubber technical data by using the process of the invention. This is illustrated by Example 4.

EXAMPLE 4

Speswhite slurry as described in Example 3 was modified with various amounts of Si69. Based on 100 parts by weight of filler, there was employed 0.5, 1, 1.8, 2.6, and 3.5 parts by weight of Si69. For this purpose, the corresponding amounts of Si69 were added to the 200 ml Marlowet CFW solution. At the highest concentration of 3.5 parts by weight, the tenside (surfactant) was omitted since this relatively large amount did not require any additional dissolving intermediary. As a comparison material, there was worked up in the same manner a Speswhite slurry without any further additives. The working up was carried out as described in the previous examples. The rubber technical data in natural and synthetic rubber are set forth in Tables 4 and 5. By the addition of larger amounts of Si69 over 0.5 parts by weight there is able to be produced further improvements of the properties.

TABLE 1

Operation of Different Surfactants In The Modification of Suprex Clay With Si69

| Tenside | Modulus 300 | |
|---|---|---|
| | Natural Rubber | Synthetic Rubber |
| Marlophen 812 | 9.6 | 7.4 |
| Marlophen 812[(1)] | 9.3 | 7.6 |
| Marlophen 820 | 9.9 | 8.7 |
| Marowet GFW | 9.6 | 9.2 |
| Barquat MB 80 | 10.1 | 9.6 |
| Sodiumdodecyl-sulfate | 9.4 | 7.7 |
| Alkylbenzene-sulfonate | 9.8 | 7.6 |
| Reference Mixture (Untreated Clay) | 8.5 | 5.0 |

[(1)]Suspension was stirred at room temperature.

TABLE 2

Comparison of the Separate Addition of Silane To The Rubber Mixture With the Modified Suprex Clay

| | Parts by Weight Silane | Modulus 300 | |
|---|---|---|---|
| | | Natural Rubber | Synthetic Rubber |
| Suprex Clay | 0 | 7.5 | 4.6 |
| Suprex Clay | 0.3 Si69 separate | 8.1 | 7.1 |
| Suprex Clay | 0.45 Si69 addition | 8.6 | 6.2 |
| Suprex Clay modified with | 0.3 Si69 | 8.9 | 8.6 |
| Suprex Clay modified with | 0.45 Si69 | 9.6 | 10.0 |
| Suprex Clay modified with | 0.3 A 189 | 8.3 | 6.9 |
| Suprex Clay modified with | 0.45 A 189 | 8.3 | 7.1 |

TABLE 3

Increase of the Moduli of Different Fillers In Comparison To Unmodified Fillers

| | Natural Rubber | | Synthetic Rubber | |
|---|---|---|---|---|
| | Modulus 100 | Modulus 300 | Modulus 100 | Modulus 300 |
| Hexafil modified[1] | 3.8 | 11.2 | 5.4 | 8.3 |
| Hexafil unmodified | 3.3 | 8.6 | 4.1 | 8.2 |
| HEWP modified[1] | 3.6 | 11.7 | 5.9 | 12.8 |
| HEWP unmodified | 3.5 | 8.9 | 3.5 | 6.3 |
| Speswhite modified[1] | 9.5 | nicht-mehr meBbar | 9.9 | nicht-mehr MeBbar |
| Speswhite unmodified | 6.7 | 12.7 | 6.4 | 8.0 |

[1]According to Example 3.

TABLE 4

Modified Speswhite In Natural Rubber

| Parts By Weight Si 69 | Modulus 100 | Abrasion Resistance | Compression Set | Firestone Ball Rebound | Goodrich Flexometer |
|---|---|---|---|---|---|
| 0 | 6.7 | 332 | 55.8 | 53.5 | 149 |
| 0.5 | 9.5 | 267 | 35.9 | 53.5 | 111 |
| 1 | 10.7 | 295 | 33.0 | 53.8 | 103 |
| 1.8 | 10.7 | 290 | 31.6 | 54.0 | 100 |
| 2.6 | 11.0 | 265 | 30.0 | 55.6 | 96 |
| 3.5 | 11.3 | 254 | 28.3 | 55.9 | 95 |

TABLE 5

Modified Speswhite In Synthetic Rubber

| Parts By Weight Si 69 | Modulus 100 | Abrasion Resistance | Compression Set | Firestone Ball Rebound | Goodrich Flexometer |
|---|---|---|---|---|---|
| 0 | 6.4 | 271 | 46.6 | 36.5 | Thermally Destroyed |
| 0.5 | 9.9 | 256 | 25.6 | 37.9 | After 10 Minutes 194 |
| 1 | 10.8 | 256 | 22.0 | 37.8 | 141 |
| 1.8 | 11.5 | 280 | 21.5 | 40.5 | 127 |
| 2.6 | 12.1 | 238 | 19.6 | 41.3 | 117 |
| 3.5 | 11.9 | 261 | 19.3 | 39.8 | 123 |

EXAMPLE 5

There was tested the influence of the emulsifier on the properties of the clay.

TABLE 6

| | Modulus 300 [mPa] | | | |
|---|---|---|---|---|
| | (a) Clay (untreated) | (b) Clay + Si69 | (c) Clay + GFW | (d) Clay + Si69 + GFW |
| Recipe 1 (Natural Rubber) | 7.7 | 8.2 | 7.7 | 9.1 |
| Recipe 2 (SBR 1500) | 5.5 | 6.7 | 5.7 | 8.5 |

It shows that the emulsifier has no influence on the rubber technical properties of the clay as, for example, can be seen from the Modulus 300 (samples a, c).

The modification of clay with Si69 in dispersions which contain less than 3 weight % Si69 based on the amount of the dispersion but which contain no emulsifier indeed lead to a certain improvement of the Modulus 300 value (sample b). However, this cannot lead to the good values which are produced by using Si69 in the same concentration in combination with an emulsifier filler (sample d) because of the insufficient distribution of the Si69 in the filler dispersion.

The entire disclosure of German priority application No. P.3314742.6 is hereby incorporated by reference.

What is claimed is:

1. A process of preparing a surface modified natural oxidic or silicate filler which comprises
   (a) emulsifying in a water insoluble organosilicon compound of the formula $$[R^1{}_n(RO)_{3-n}Si\text{-}(Alk)_m\text{-}(AR)_p]_2[S]_x \quad (I)$$

where
R is an alkyl group having 1 to 4 carbon atoms, or is a $C_1$–$C_4$-alkyl-$C_1$–$C_4$ alkoxy group or a phenyl group and $R^1$ is an alkyl group having 1 to 4 carbon atoms or the phenyl group,
n is 0, 1, or 2,
Alk is a divalent straight or branched hydrocarbon group having 1 to 6 carbon atoms,
m is 0 or 1,
Ar is an arylene group having 6 to 12 carbon atoms in the rings,
p is 0 or 1 with the proviso that p and m cannot simultaneously be zero, and x is a number from 2 to 8,
   (b) with stirring mixing this emulsion with an aqueous suspension of a finely divided oxidic or silicate filler or a mixture of such fillers at a temperature of 10° to 50° C., (c) heating the mixture to a temperature of 50° to 100° C., and (d) after 10 to 120 minutes, filtering off the modified filler and drying the suspension at a temperature of 100° to 150° C., or spray drying the suspension.

2. A natural oxidic or silicate filler according to claim 1 where n is 0, Alk is an alkylene group of 1 to 4 carbon atoms, m is 1, p is 0, $R^1$ is an alkyl group of 1 to 4 carbon atoms.

3. A natural oxidic or silicate filler according to claim 2 where all three $R^1$ groups are ethyl, Alk is an alkylene group of 2 to 4 carbon atoms, and x is a number from 2 to 4.

4. A natural oxidic or silicate filler according to claim 3 where the organosilane compound is bis-3-(triethoxysilyl)-propyl tetrasulfane.

5. A natural oxidic or silicate filler according to claim 4 wherein the filler is clay, kaolin, kieselguhr, diatomaceous earth, aluminum oxide, aluminum hydroxide, aluminum trihydrate, or titanium dioxide.

6. A natural oxidic or silicate filler according to claim 1 wherein the filler is clay, kaolin, kieselguhr, diatomaceous earth, aluminum oxide, aluminum hydroxide, aluminum trihydrate, or titanium dioxide.

7. A natural oxidic or silicate filler according to claim 1 wherein the filler contains 0.3 to 15 weight % of the organosilicon compound based on the dry filler.

8. A natural oxidic or silicate filler according to claim 7 wherein the filler contains 0.3 to 2 weight % of the organosilicon compound based on the dry filler.

9. A process according to claim 1 wherein a surface active material is present during the emulsification.

10. A process according to claim 1 wherein the emulsification is carried out in the absence of a surface active agent and the concentration of the organosilicon compound is less than 3 weight %.

* * * * *